Sept. 3, 1968     T. J. McGEAN ETAL     3,399,449
METHOD OF MAKING COAXIAL CABLE
Filed June 9, 1966     4 Sheets-Sheet 1
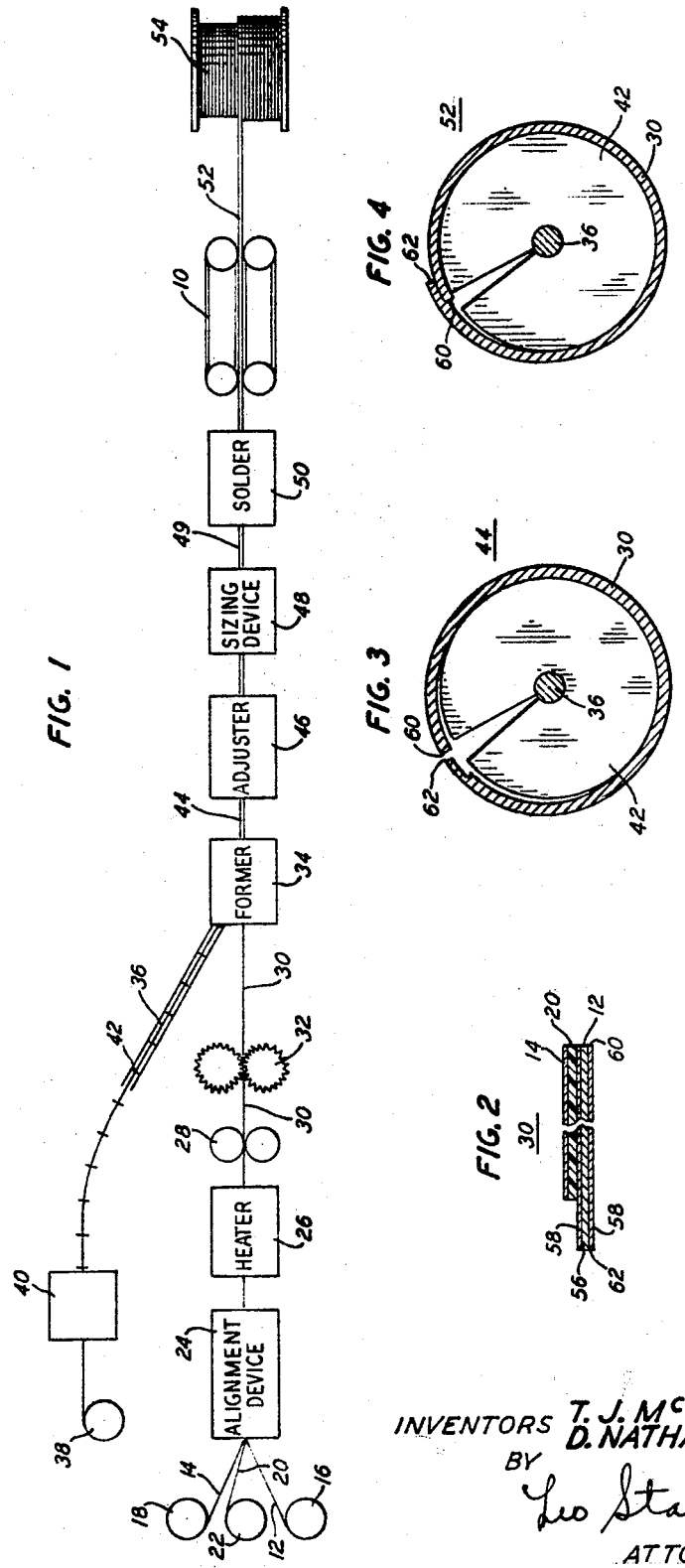

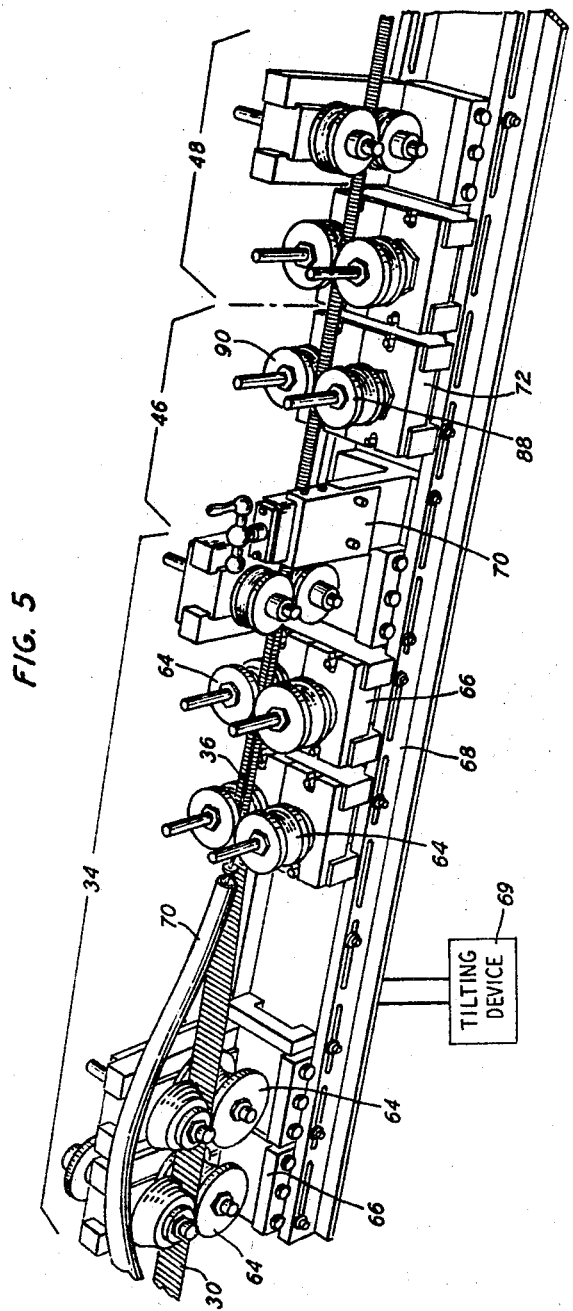

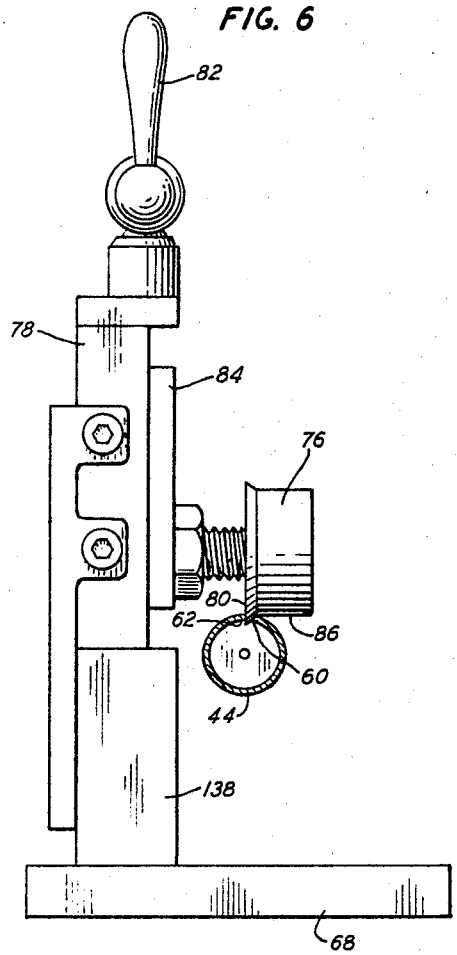
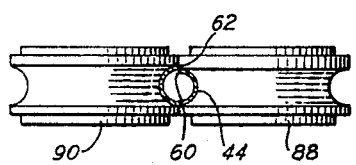
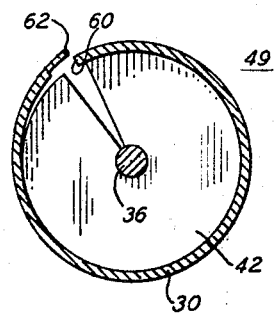

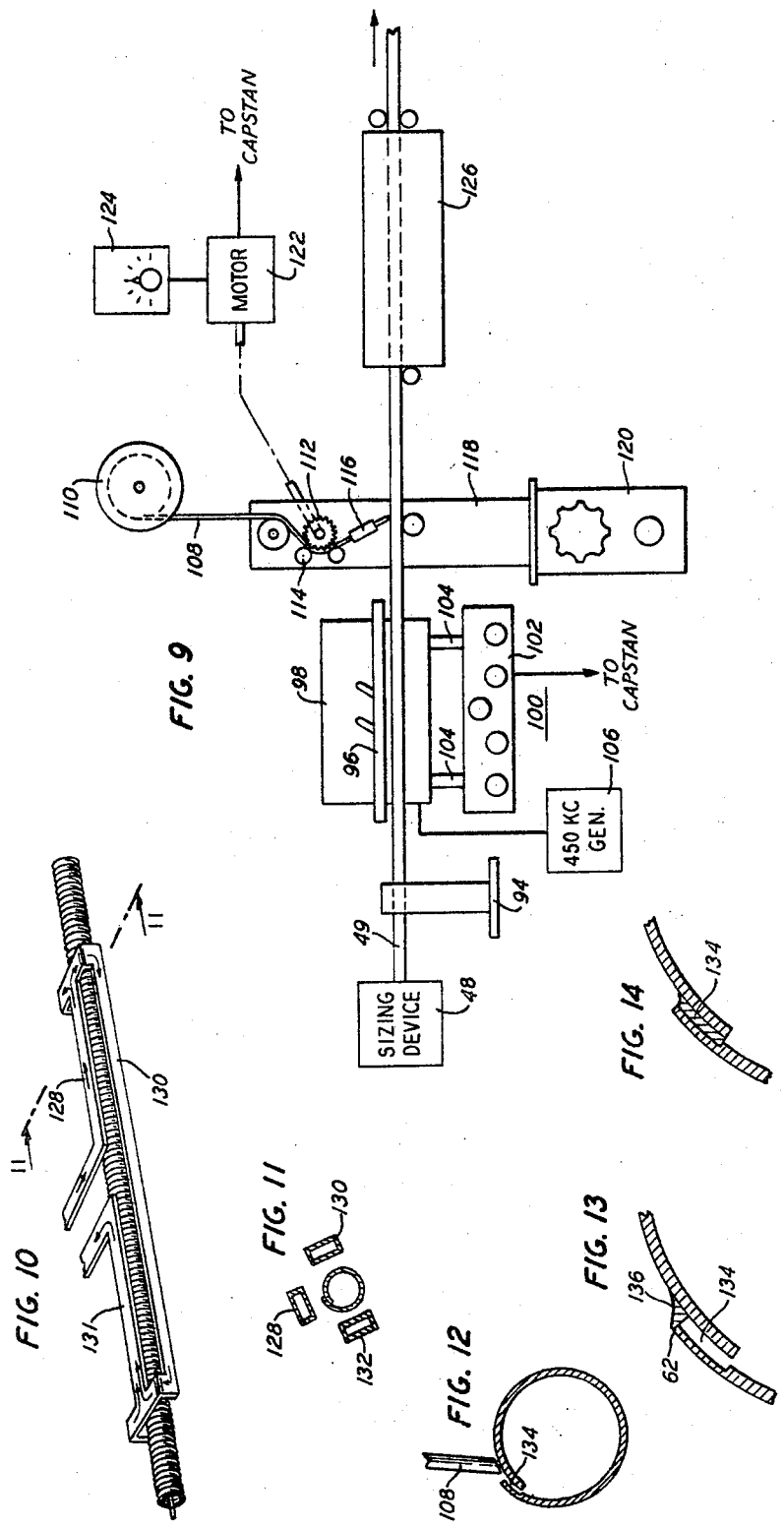

United States Patent Office 3,399,449
Patented Sept. 3, 1968

3,399,449
METHOD OF MAKING COAXIAL CABLE
Thomas J. McGean, East Orange, and Daniel Nathanson, Elizabeth, N.J., assignors to Bell Telephone Laboratories, Incorporated, Berkeley Heights, N.J., a corporation of New York
Filed June 9, 1966, Ser. No. 556,486
6 Claims. (Cl. 29—477.7)

This invention relates to manufacture of coaxial cables and particularly to method and means for sealing the seam of a tubular outer conductor as the latter rapidly moves in a longitudinal direction after it has been transversely folded about the dielectric that holds the center conductor coaxially within the outer conductor in the individual cable coaxial. The invention has special relevance to sealing the moving seam on the outer conductors of laminated metals that are transversely corrugated as described in the copending application of M. C. Biskeborn et al., Ser. No. 507,391, filed June 10, 1965, and assigned to the assignee of this invention.

Sealing outer conductors on individual cable coaxials is desirable to prevent environmental moisture from entering the coaxial interior and thereby degrading the coaxial's electrical performance. Aside from this advantage, seam seals afford coaxials considerable strength and the dimensional uniformity necessary for efficient electrical propagation. Moreover such seals, if they are metallic, furnish the propagating waves with a complete electrical shield.

One method of sealing the seam on outer conductors is to weld them. However this process is effective only where the dielectric material spacing the center conductor from the outer conductor is not susceptible to destruction by the welding heat. Moreover, such welding breaks down the bonding material in the laminate of the beforementioned copending Biskeborn et al. application. Methods of joining the seam with an adhesive, which are sometimes used, fail to afford the desired electrical shielding effects.

Other methods of sealing involve soldering the seam. For example, attempts have been made to seal a coaxial seam electrically and mechanically by longitudinally moving the seam at the bottom of the outer conductor through a fountain of molten solder as the cable is being manufactured. Also, consideration has been given to sealing the outer conductor's seam by placing the solder into the seam in solid form before heating it. These methods suffer from serious disadvantages especially when used for sealing the overlapping seam of coaxials such as those described in the copending application of M. C. Biskeborn et al. mentioned above. For instance, passing the moving cable through a solder fountain which must be pumped to a height spreads considerable molten solder about the wide parts of the coaxial periphery. Upon cooling, such solder fills the valleys in the coaxial corrugations and reduces the flexibility that the corrugations attempt to impart to the coaxial. In ordinary use this inflexibility may cause cracks in the seal. Placing unmelted solder in the cable for the purpose of later heating it requires spreading the seam's metal edges during the solder placement process, heating, and then forcing the seam's metal edges together while the solder cools. This disturbs the solder in its plastic state and produces other stresses in the coaxial. Such a device is susceptible to cracks and failures.

Aside from the above-mentioned deficiencies former soldering methods have also required large amounts of flux which may enter the cable interior and adversely affect its performance. In fact, all these methods have depended upon a prior application of flux either hot or cold to the seam. In either case, the afterflow of solder drives considerable flux from the seam, either in molten or vaporized form, into the coaxial interior. Where the cable is subject to preheating prior to the application of solder, but after application of the flux, the accumulated heat may vaporize the flux so that a large portion enters the coaxial interior. Even if it is not vaporized the forward face of solder entering the seam forces considerable quantities of flux into the cable interior. This flux degrades the electrical performance of the cable.

In all these cases, the flow of solder into the seam is by no means guaranteed. On a rapidly moving seam the solder may simply flow to the adjacent areas. The technique of "sweating," that is, continuous application of heat to the solder in the seam, to encourage flow is impractical in a moving coaxial and may also melt the plastic spacers or dielectric along with any laminate bonding material.

An object of the present invention is to improve methods and means for sealing the longitudinal seam of the outer conductor on a rapidly moving cable coaxial and particularly to avoid the above-mentioned deficiencies.

Another object of the invention is to seal the moving outer conductor that is being manufactured at high rates of speed without flooding the seam with excessive solder, while nevertheless avoiding skips in the soldering action of the seam.

Another object of the invention is to decrease to insignificance the flux driven into the coaxial interior by the process of sealing a moving coaxial.

Still another object of the invention is to mechanically and electrically seal the seam on the outer conductor of a coaxial at a uniform rate as the coaxial is being manufactured at high speed without distorting the shape of the coaxial or imparting thereto internal stresses.

According to the invention, these objects are obtained by overlapping the seam of a continuously formed outer conductor on a rapidly moving coaxial only after imparting different diameters to the outer conductor cross section at the seam edges so that the overlapping metals nest within each other with sufficient intimacy to form a capillary separation with respect to hot solder and then orienting the overlapped seam so that the seam edge form with the nearest metal edge of the other side of the seam an upwardly facing V-shaped well and so that the seam itself extends angularly downward. According to the invention the seam is finished by inductively preheating the seam area so that a thermal distribution occurs as the outer conductor moves longitudinally, and then feeding a fluxed solder-wire to the moving conductor at or just above the well. The solder and flux melt simultaneously and flow into the well as the well travels away from the solder supply. The solder and flux spread longitudinally along the moving well as a solder-flux system before the flux is drawn into the seam by capillary action. According to a feature of the invention the solder wire is guided toward the outer conductor but is free to bend just before it reaches the outer conductor.

By virtue of the invention, only the amount of solder necessary to fill the seam is melted into the well. The gravitational feed into the well prevents the solder from spilling over the edge end of the well. Since the molten solder, once it is in the well, is removed from its source by the moving outer conductor from solder wire only that amount of solder fills the seam. The capillary action of the seam in effect drains the well and prevents solder from accumulating outside the seam.

These and other features of the invention are pointed out in the claims. Other objects and advantages of the invention will become obvious from the following detailed description when read in light with the accompanying drawings wherein:

FIG. 1 is a partly schematic block diagram of a coaxial

3 manufacturing apparatus embodying features of the invention;

FIG. 2 is a cross-sectional view of the flat outer conductor prior to its being formed by the apparatus of FIG. 1;

FIG. 3 is a cross-sectional view of the outer conductor after it has been formed into a tubular shape;

FIG. 4 is a cross-sectional view of the completed coaxial of FIG. 1;

FIG. 5 is a perspective view of the roll former, adjusting device, and sizing device in FIG. 1;

FIG. 6 is an end view of one stage of the adjusting device of FIG. 5 operating upon the coaxial as it is being formed;

FIG. 7 is an end view of another stage of the adjusting device of FIG. 5;

FIG. 8 is a cross-sectional view of the coaxial emerging from the sizing device in FIG. 5;

FIG. 9 is a block diagram of the solder device in FIG. 1;

FIG. 10 is a perspective view of the coil used to preheat the outer conductor in FIG. 9 is it operates upon the coaxial;

FIG. 11 is a section 11—11 of FIG. 10;

FIG. 12 is a cross-sectional view of the outer conductor in FIG. 11 as the solder is being applied;

FIG. 13 is a sectional view of the moving outer conductor after the solder has been applied and forms in the well; and FIG. 14 is a cross-sectional view of the outer conductor of FIG. 1 after it has drawn the solder from the well to the seam.

In FIG. 1 a coaxial manufacturing apparatus that practices the invention utilizes a capstan 10 to furnish the drawing power. The speed may vary from 20 to 100 feet per minute. In particular, the capstan 10 draws a tin-plated steel tape 12 of tin can stock and a narrower conductive tape 14 composed of copper or aluminum off respective lower and upper storage rolls 16 and 18. It also draws an adhesive band 20 of material available from the Dow Chemical Company under the designation PZ 4333.9 from an intermediate roll 22. An alignment device 24 aligns one edge of the wider steel tape 12 with an edge of the narrower conductive tape 14 while sandwiching the band 20 between them. A heater 26 heats the sandwich continuously emerging from the alignment device 24 to a temperature of about 320° F. This is sufficient to soften the adhesive band 22 so that a pair of rolls 28 can squeeze the tapes together into the laminated metal-bond-metal ribbon 30 shown in FIG. 2. After air-cooling a pair of geared rolls 32 corrugate the moving ribbon 30 transverse to its longitudinal direction.

A roll-former 34 such as described in the copending application of T. J. McGean, Ser. No. 507,330 filed Nov. 12, 1965, continuously receives the resulting ribbon 30. Also arriving at the former 34 is a continuously advancing center conductor 36 passing from a roll 38 through a disc applicator 40 that applies a plurality of spacer discs 42 at longitudinally separated locations along the conductor 36. Such disc applicators are known from Patents 2,404,782, 2,579,468, 2,579,486 and 2,579,487. The roll-former 34 rolls the continuously-advancing transversely-corrugated ribbon 30 crosswise, steel tape outside, about the disc-carrying center conductor 36. This produces a tubular outer conductor 44 with a longitudinal seam as shown in FIG. 3. An adjuster 46 rolls the outer conductor 44 near its longitudinal seam so that the edge where the border of the tapes 12 and 14 are aligned exhibits a radius smaller than the edge with the protruding steel tape. A sizing device 48 then overlaps the protruding steel-tape edge over the aligned edge before feeding the resulting unsoldered coaxial 49 to a soldering device 50. The latter seals the seam electrically and mechanically. The capstan 10 feeds the completed coaxial 52 onto a take-up spool 54.

4

In FIG. 2, illustrating the completed ribbon 30 that passes to the rolls 32, the thicknesses are somewhat exaggerated. The steel tape 12 includes a steel substrate 56 having tin layers 58 coated on its upper and lower faces. The conductive ribbon 14 together with the tape 12 sandwich the adhesive band 20 between them. In accordance with the action of the alignment device 24, the right tape edges of the tapes 12 and 14 are aligned to form a thick ribbon edge 60. Thus, the left edge of the steel tape 12 protrudes beyond the corresponding edge of the conductive tape 14. This edge forms a thin ribbon edge 62.

FIG. 3 illustrates the cross section of the ribbon 30 after it emerges from the former 34 in the shape of a partly finished outer conductor 44 and surrounds the center conductor 36 as well as spacers 42. The edges 60 and 62 of the ribbon 30 almost close at an open seam on the outer conductor 44. This seam is overlapped and soldered by the sizing device 48 and the solder device 50 to form the coaxial 52 whose cross section appears in FIG. 4. In both FIGS. 3 and 4 the thickness of the outer conductor is exaggerated.

Details of the former 34, the adjuster 46 and the sizing device 48 appear in FIG. 5. Here, a number of roll pairs 64 supported on individual blocks 66 all longitudinally adjustable along a rail stand 68 fold the ribbon 30 about the disc-carrying center conductor 36 as the latter emerges from the tube 70. This is explained in copending application of T. J. McGean mentioned above. The roll pairs 64 have ridges which orient the seam on the outer conductor 44 upwardly relative to the stand 68. A tilting device 69 rotates the stand 68 from the horizontal 45 degrees about its longitudinal axis so that the seam forms 45 degrees over to the side as shown in FIG. 4.

The adjuster 46 operating upon the assembled ribbon and center conductor illustrated in FIG. 3 comprises two stages 70 and 72 also mounted on the rail stand 68. The stage 70 constitutes a seam-positioner illustrated in more detail in FIG. 6. This positioner is shown vertically although the stand 68 tilts it 45 degrees. Here, a wheel 76 cantilevered along an axis from a stand 78 possesses a knife edge 80. An adjusting handle 82 turns a worm that raises or lowers the bearing assembly 84 of the wheel 76 until it fits into the upwardly facing seam of the tubular outer conductor 44. In FIG. 6, the axial width of the knife edge appears exaggerated for clarity. Since the ribbon 36 has previously been oriented by the folding action of the former 34 to place its seam at the top relative to the stand 68, the knife edge, when forced therein, places a peripheral clockwise torque on the tube or ribbon as it appears in FIG. 6. The edge 60 of the seam abutting the angular face of the knife edge 80 is thus continuously biased against this face. The flat part 86 of the wheel 76 lightly depresses the edge 60.

The stage 72 comprises the usual sliding blocks supporting two horizontal rolls 88 and 90. The rolls are shown in detail in FIG. 7. These rolls 88 and 90 immediately take advantage of the depression and torque furnished by the seam-positioner. The roll 88 on the underlapped side of the seam has a radius .014 inch smaller than the roll 90 on the overlapped side. This results in a shape whose overlapped diameter is .028 inch greater than the overlapped diameter as shown in FIG. 8 where the space at the overlap has been exaggerated for clarity. The clockwise torque developed by the knife edge wheel 76 preceding this pair of rolls 88 and 90 presses the edge 62 against the peripheral surface of the roll 88 having the profile with the smaller radius. The thus-displaced edges furnish assurance that the overlap will be formed to final size without crosslap. The sizing device 48 constitutes two stages of roll pairs which reduce the diameter of the folded ribbon to its final size while overlapping the edges. Here the roll pairs press the gap in the seam together enough so the outer conductor emerging has an overlapping seam with a gap of .005 inch.

According to the invention, the apparatus illustrated in FIG. 5 and resting on the stand 68 is not oriented horizontally with vertically upstanding axes but is tilted 45 degrees by the adjustable tilting device about the longitudinal axis of the coaxial 52 so that the overlapping seam forms the vertical well as illustrated in FIG. 13.

FIG. 9 illustrates the details of the soldering device 50. Here, the unsoldered coaxial 49 emerging from the sizing device 48 passes through a seam-positioning die 94 wherein two hard steel split rings with a step exert a positive tangential force against the overlap edge of the seam. This helps hold the position of the seam against any torque of the capstan 10. Preheating the thus-biased seam is a heating coil 96 whose leads project from a transformer 98 in an induction heating apparatus 100. The latter includes a control panel 102 for moving the transformer 98 and the coil 96 being carried thereby on struts 104 into any desired position relative to the coaxial 49. The induction heating apparatus 100 receives its power from a five-kilowatt generator 106 operating at 450 kilocycles. The power is connectable to the capstan 10 to increase the heating in step with the coaxial feed.

The preheated coaxial 49 is soldered at the seam by a rosin-cored solder wire 108 feeding off a spool 110. Driving the solder toward the coaxial at a regulated rate is a gear 112 whose surface presses the solder against the peripheries of two idler rolls 114. A guide tube 116 guides the solder wire toward the desired contact position on the preheated coaxial 49. The solder wire then continues unconstrained to the coaxial.

Carrying the advancing gear 112 and the guide tube 116 is a housing 118. A positioning control 120 controls the position of the housing 118 and hence the location at which the solder wire 108 is applied to the outer conductor of the preheated coaxial. A solder drive motor 122 whose speed is regulated by a motor control 124 drives the wire-advancing gear 112. The motor control 124 is connectable to receive speed information from the capstan 10 and thus can force the speed of the gear 112 into steps with the capstan speed. A cooling trough 126 cools the solder that entered the seam in the coaxial 52 as well as the coaxial to prevent damage to plastic spacers and adhesive.

FIGS. 10 and 11 illustrate the details of the heating coil 96 and its position relative to the coaxial 49. The coil carries full current from the transformer 98 through a center leg located directly opposite edge 62 at the seam. Two outer legs 130 each carry substantially half of the transformer current to heat the areas adjacent the seam. A return leg 131 carries full current back to the transformer 98. FIG. 11 particularly illustrates the position of the coil 96 relative to the seam on the coaxial 49 whose position in turn was determined by the tilt of the roll stand 68.

In FIG. 11 and the following FIGS. 12 to 14 the thicknesses of the outer conductor and the seam gap are exaggerated for clarity.

In operation of the solder device, the solder in solid form designated 108 is applied by directing the wire 108 to the preheated and prepositioned coaxial 49 at the location illustrated in FIG. 12. Here the seam is tilted 45 degrees from vertical. Upon touching the preheated outer conductor 44 at this location, the solder wire 108 melts and flows by force of gravity toward the longitudinally, fast-moving seam which in FIG. 12 is designated 134. The seam's gap is exaggerated for clarity. In the first instance the solder and the flux therein form a solder-flux system of molten material that collects in a continuous V-shaped well formed by the edge 62 with the metal as shown in FIG. 13. The gap of the seam 134 is actually quite small, about .005 inch. The solder-flux system does not flow in immediately. After a short time when the coaxial has traveled longitudinally and this molten solder and flux system 136 has departed from its source of supply, the flux-solder system 136 is drawn into the narrow gap of the seam 134 by capillary action. This is shown in FIG. 14. The capillary action prevents the solder from flowing through the seam. Moreover, because the supply of molten solder and flux is now remote from its original source, only enough solder flows into the seam to fill it.

The absence of extra liquid, solid, or vaporized flux in the seam prior to the entrance of the flux in the solder-flux system prevents the forward wall of the advancing solder-flux system from pushing significant amounts of flux into the coaxial interior. The cooling trough prevents the buildup of heat in the system from affecting the adhesive material of the outer conductor or from affecting the plastic spacers centering the inner conductor. A firm outer conductor having excellent shielding and moisture-excluding properties results.

In summary, the outer conductor 30 is formed about a spacer-carrying center conductor as illustrated in the beforementioned Biskeborn et al. patent application with a former described in the beforementioned copending McGean application. Tilting the roll stand 68 that holds the adjuster 46 and sizing device 48 by 45 degrees, and tilting the seam-positioning die 94 an equal amount, then locates the continuously-moving seam 134 in an angular position as shown in FIG. 12. Moreover, the adjuster and sizing device by imparting two different radii to the metal adjacent the seam edges nest the edges into each other so that the seam forms an overlap joint of about five mils. By heating the outer conductor as shown in FIGS. 10 and 11, a solder wire 108 when applied as shown in FIG. 12 is melted. It then forms a solder-flux system. This sits as a puddle in the V-shaped well at the entrance of the seam 30. Thereafter the advancing outer conductor removes the system from its source. When the solder-flux system has traveled from its source, it is drawn into the seam by capillary action.

Leaving the solder wire beyond tube 116 unconstrained, helps control the amount of solder fed to the fast-moving outer conductor. The temperature also helps. The outer conductor which is heated to approximately 600° F. at the seam can melt only a certain amount of solder in any time period. If the solder is being fed too fast, the outer conductor drags the end of the unconstrained wire along, thereby rendering the angle of feed beyond tube 116 more acute. If excessive solder feed makes the angle too acute, the outer conductor melts only the lower portion of the solder wire. The unmelted portion flakes off as chips. An operator can readily observe this phenomenon and vary the solder feed speed accordingly. If the amount of solder is ultimately insufficient to fill the seam, the temperature of the outer conductor must be raised.

Because the guide tube 116 ends before the end of the solder wire the solder wire may not rest exactly on the desired peripheral contact point of the outer conductor. However, this does not affect the operation. Because the well faces upwardly, as long as the solder wire hits the outer conductor surface above the well, gravitational force and predilection toward the hotter seam of the outer conductor moves the molten solder toward the well formed by the seam. As shown in FIG. 11, the outer conductor is heated more intensely near the seam.

The heated solder remains in the upstanding V-shaped well for a combination of reasons that act simultaneously. For example, the molten solder-flux system encounters the constriction of the well bottom, namely the gap of the seam. To enter the narrower seam the flow of the solder-flux system must be accelerated. Moreover, the solder has not yet absorbed sufficient heat from the surrounding outer conductor so that its viscosity is low enough to enter the seam and wet the seam walls. At the same time, the wetting action of the flux component of the flowing system has not yet had time to scour and clean the seam walls. As a result, the solder sits in the well as it would in a funnel and seeks a level as it departs from its source. By seeking this level, the liquid solder-flux system spreads itself longitudinally and fills in any voids in the well. After a short time, the capillary action of the seam draws the uniformly distributed solder from the well into the seam.

The capillary action at the well not only draws in the solder-flux system but prevents it from entering the interior of the moving coaxial where it would degrade the electrical performance. By applying the solder in solid form at speeds in consonance with the heat in the outer conductor at positions above or at the well, the solder is prevented from overflowing the edge of the overlap and entering the crevices of the corrugations. Confining the solder to the narrow seam produces an extremely tight joint. No significant amounts of solder enter the coaxial interior, yet the entire system is virtually filled to provide excellent shielding and mechanical closure. A tight joint results.

While an embodiment of the invention has been described in detail, it will be obvious to those skilled in the art that the invention may be employed otherwise without departing from its spirit and scope. For example, the stand 68 need not be tilted at 45 degrees. Any tilt, such as between 30 degrees and 60 degrees, suitable for forming the V-shaped well at the edges of the outer conductor is contemplated.

What is claimed is:

1. The method of forming the outer conductor of a cable coaxial, which comprises longitudinally moving an elongated conductor sheet, bending said sheet transversely into a round cross section as it moves longitudinally so as to form a longitudinal seam, imparting different cross-sectional radii to the two portions of the longitudinally moving sheet at the seam, closely overlapping the opposing edges of the moving sheet so as to form an overlap portion and underlap portion, while bending and imparting different radii to said sheet orienting the sheet so that the edge of the overlapping portion of said sheet forms with the sheet adjacent the underlap a V-shaped well and so that the cross section of the overlap seam extends angularly downward, heating the vicinity of the seam of the curved moving sheet by moving the sheet under stationary heating means that extend only partly around the curved sheet periphery, feeding a flux-cored solder wire to the heated sheet at a locus of peripheral points above the V-shaped well and on the underlap side of said well so that the solder can flow down into the well and be drawn into the overlap.

2. The method as in claim 1 wherein said flux-cored wire is fed in step with the speed of the moving sheet.

3. The method as in claim 2 comprising the step of corrugating said sheet prior to bending.

4. The method as in claim 2 wherein said tubular sheet is heated more intensely at the seam and less intensely as the periphery departs from the seam.

5. The method as in claim 2 wherein said sheet is formed by laminating a tape of structural metal to a narrower tape of conductive metal so that one edge of said wider tape protrudes beyond the narrower tape.

6. The method as in claim 5 wherein during overlapping said protruding edge of the tape of structural material is overlapped over the other edge.

References Cited

UNITED STATES PATENTS

| | | | |
|---|---|---|---|
| 993,195 | 5/1911 | Phelps | 29—499 X |
| 1,508,076 | 9/1924 | Taylor | 29—499 X |
| 2,055,360 | 9/1936 | Ogden | 29—499 X |
| 2,727,301 | 12/1955 | Magnus | 29—477 |
| 2,787,827 | 4/1957 | Karmazin | 29—477.7 |
| 3,302,281 | 2/1967 | Freeman et al. | 29—477 X |

JOHN F. CAMPBELL, *Primary Examiner.*

JOHN L. CLINE, *Assistant Examiner.*